United States Patent [19]
Tanaka et al.

[11] Patent Number: 5,700,091
[45] Date of Patent: Dec. 23, 1997

[54] SNAP FASTENER AND A BAG FOR PACKAGING WITH A SNAP FASTENER

[75] Inventors: Kenichi Tanaka; Masao Takashige, both of Himeji, Japan

[73] Assignee: Idemitsu Petrochemical Co., Ltd., Tokyo, Japan

[21] Appl. No.: 707,521

[22] Filed: Sep. 4, 1996

[30] Foreign Application Priority Data

Sep. 4, 1995 [JP] Japan .................... 7-226416

[51] Int. Cl.$^6$ .................................... B65D 33/24
[52] U.S. Cl. .............................. 383/63; 24/587
[58] Field of Search ................. 383/63, 64, 65; 24/587

[56] References Cited

U.S. PATENT DOCUMENTS

| | | | |
|---|---|---|---|
| 5,004,356 | 4/1991 | Matsui | 383/63 |
| 5,335,997 | 8/1994 | Kanemitsu et al. | 383/63 |
| 5,415,904 | 5/1995 | Shigezo et al. | 383/63 |
| 5,462,360 | 10/1995 | Tilman et al. | 383/63 |
| 5,603,995 | 2/1997 | Takubo et al. | 383/63 |
| 5,622,431 | 4/1997 | Simonsen | 383/63 |

FOREIGN PATENT DOCUMENTS

| | | |
|---|---|---|
| 0371402A3 | 6/1990 | European Pat. Off. . |
| 0484599A1 | 5/1992 | European Pat. Off. . |
| 0517971A1 | 12/1992 | European Pat. Off. . |
| 0566363A1 | 10/1993 | European Pat. Off. . |
| WO 90/04544 | 5/1990 | WIPO . |

Primary Examiner—Stephen P. Garbe
Attorney, Agent, or Firm—Flynn, Thiel, Boutell & Tanis, P.C.

[57] ABSTRACT

A snap fastener having a male strip member and a female strip member, mutually engaged and respectively having a band-like base portion and a snapping portion having a snapping function, in which the band-like base portion includes a first layer fused onto a bag body; a second layer laminated onto the first layer; and a third layer laminated onto the second layer, and further the first layer is consisted of a resin film fusing the inner-most layer of the bag body, the second layer consists of a biaxially oriented film, the third layer consists of a resin film fusing the snapping portion, and the snapping portion consists of synthetic resin having a melt index (MI) of 1–20 g/10 min. At least one layer of the biaxially oriented nylon film consists 40–85% by weight of nylon 6 (Ny 6) and 15–60% by weight of metaxylylene adipamide (MXD 6), in which both magnifications of the MD direction (the moving direction of the film) and the TD direction (the direction of the width of the film) in extending are more than 2.8 times.

5 Claims, 3 Drawing Sheets

SNAP FASTENER AND A BAG FOR PACKAGING WITH A SNAP FASTENER

BACKGROUND OF THE INVENTION

1. Field of the Invention

This invention relates to a snap fastener and a bag for packaging with a snap fastener, which are used as packaging for food or medical equipment.

2. Description of the Related Art

A bag (a snap bag) capable of opening has been used in many areas, such as food, medical equipment, variety goods and so on, by providing a band-like snap fastener (a fixation), composed of a male strip member and a female strip member, at the opening portion of the bag. Various methods for producing the bag for packaging with the snap fastener are proposed.

For example, (1) a method in which the bag body film, composed of the male strip member and the female strip member of the snap fastener, is produced by extrusion molding one piece, (2) a method in which the snap fastener is molded to be extruded onto the bag body film, and (3) a method in which the snap fastener, having a band-like base portion (a tape portion) is previously made and then fused by heat through the band-like portion onto the bag body film.

Method (3) of the above producing methods has been typical lately from view of cost for producing, management and so on.

As material for the snap fastener, generally, a low-density polyethylene (LDPE) and polypropylene (PP) are used, and a sealant of the inner-most layer of the bag body fused with the snap fastener has the same type of resin. For instance, in the case where the sealant of the bag body consists of LDPE, the material of the snap fastener uses the same LDPE.

The bag for packaging with the snap fastener is repeatedly opened after the bag is opened once, therefore, it is desirable that the opening produced between the snap fastener and the top seal of the bag is in a straight-line to easily reopen. For allowing the bag to have a linear cut operation, conventionally, a structure, in which a uniaxial oriented film is bonded along the opening area between the snap portion and the top seal of the bag onto the bag body, has been proposed, the aforementioned bag for packaging with the snap fastener, however, has a disadvantage of cost in view of the increased number of processes in production.

In the case where the bag body has aluminum foil as the middle layer of its base film, when the snap portion corresponding to the position of the end of the bag is crushed with pressure and heat, in the conventional bag for packaging with the snap fastener, the vicinity of the snapping portion, having a snapping function, is not sometimes sufficiently softened although the vicinity of the band-like base portion is softened. Provided that the snap portion is forcibly pressed in the aforementioned conditions, the non-softened area damages the aluminum foil of the bag body, with the result that a moisture-proof effect of the aluminum foil is impaired.

Furthermore, the conventional snap fastener consists of LDPE or the like and has a propensity to retain a shrinking stress in the MD direction (the moving direction of the snap fastener). As a result, when the snap portion is fused by heating through the band-like base portion onto the bag body, the aforementioned remaining stress is loosened by heat, so that creases are produced on the fusing portion of the band-like base portion and the bag body, with the result that the level of production has been reduced.

SUMMARY OF THE INVENTION

The first invention is a snap fastener, having a male strip member and a female strip member which are mutually engaged and respectively have band-like base portions and snapping portions having a snapping function, which is characterized by including a first layer formed in the band-like base portion to fuse onto a bag body; a second layer formed in the band-like base portion to be laminated onto the first layer; and a third layer formed in the band-like base portion to be laminated onto the second layer, with the first layer consisting of a resin film fusing the inner-most layer of the bag body, the second layer consisting of a biaxially oriented film, the third layer consisting of a resin film fusing the snapping portion, and the snapping portion consisting of synthetic resin having a melt index (MI) of 1–20 g/10 min.

It is preferable that the resin film of the first layer is the same type of resin film as resin (e.g., L-LDPE, PP) used for a sealant, but, may be a resin film having a fine adhesive such as ethylene-methyl acrylate random copolymer (EMA) for the sealant of polybutylene terephthalate (PBT) type.

It is preferable that a resin film of the first layer has a lower melting point than a film of the second layer. In the case in which the melting point of the resin film of the first layer is higher than the film of the second layer, when the snap fastener is fused to the bag body by heating, the film of the second layer melts, with the result that an effect whereby creasing stops appearing, according to the present invention.

As a material of the biaxially oriented film of the second layer, an arbitrary material can be chosen, it is, however, preferable to choose, from the view of transparency, nylon (Ny, e.g., the thickness of 15 μm), polypropylene (PP, e.g., the thickness of 20 μm) and polyethylene terephthalate (PET, e.g., the thickness of 12 μm), with nylon being the most preferable in considering the linear cut operation.

The biaxially oriented film has distinctions which are the film's linear cut operation resulting from the orientation of molecules inside the film, the higher stretched elastic force resulting from being extended, and smaller shrinkage by heating resulting from being secured at all times.

The biaxially oriented film is arranged for each band-like base portion of the male strip member and the female strip member as described above, in addition, the biaxially oriented film generally used in the base film of the bag body, in total, four pieces of the biaxially oriented film is cut simultaneously while opening the bag, therefore, the desirable linear cut operation can be obtained by a synergistic effect of the four pieces of the biaxially oriented film.

Further, when the snap fastener corresponding to a position at the end of the bag is forcibly pressed, the biaxially oriented film of the second layer absorbs force generated to the bag body, therefore, aluminum foil is prevented from being damaged even in the case where aluminum foil consists as a layer of the bag body.

The resin film of the third layer is preferably a film of the same type resin as the resin of the snapping portion (PP or the like), if possible to fuse, a different resin film from the resin of the snapping portion may be used. It is preferable that the resin film of the third layer has approximately the same or higher melting point as or of the resin film of the first layer. In the case in which the melting point of the resin film of the third layer is lower than the resin film of the first layer, when the snap fastener is fused to the bag body by heating, the bag might be produced in a faulty way by fusing the third layer to a space-making plate arranged between the male strip member and the female strip member in order to prevent from fusing with each other.

If the melt index (MI) of the snapping portion is less than 1 g/10 min., it will result in a melt fracture, and if it is more than 20 g/10 min., it will result in inferior moldability (the performance of retaining the mold). More preferably, MI is 2–8 g/10 min.

Arbitrary materials of the snapping portion can be used if it is synthetic resin, for example, generally used PE, PP, EVA, EMMA (ethylene-methyl methacrylate random copolymer) and so on can be listed.

The snap fastener according to the second invention is characterized by the fact that the biaxially oriented film of the second layer is a biaxially oriented nylon film having more than one layer.

By choosing, especially, the biaxially oriented nylon film of the biaxially oriented films, the desirable transparent film as well as the linear cut operation are simultaneously obtained.

The snap fastener according to the third invention is characterized by the fact that at least one layer of the biaxially oriented nylon film consists of 40–85% by weight of nylon 6 (Ny 6) and 15–60% by weight of meta-xylylene adipamide (MXD 6), in which both magnifications of the MD direction (the moving direction of the film) and the TD direction (the direction of the width of the film) in extending are more than 2.8 times.

In the content of less than 15% by weight of MXD 6, the desirable linear cut operation cannot be obtained, but in the case of exceeding 60% by weight, impactive strength is reduced, therefore, the preferable forcibly pressing operation cannot be obtained.

Even when the second layer is composed of the biaxially oriented nylon film of multi-layers, if it is a film consisting of the aforementioned Ny 6 and MXD 6 as at least one layer, the desirable linear cut operation of the whole second layer exerts.

The bag for packaging with the snap fastener according to the fourth invention is characterized by the fact that the snap fastener according to any one of the first invention to the third invention is fused through the first layer onto the bag body.

The snap fastener of the present invention is fused through the band-like base portion relating to the aforementioned three-layer structure onto the bag body, therefore, creases caused from shrinking by heating are not produced.

The bag for packaging with the snap fastener according to the fifth invention is characterized by, in the fourth invention, a first fusing portion formed adjacent to the snapping portion which is formed in a fusing portion fusing between the snapping portion and the bag body; and a second fusing portion formed in the opening side of the bag body to oppose a non-fusing portion from the first fusing portion which is formed in the fusing portion fusing between the snapping portion and the bag body.

When the bag is opened, the band-like base portion and the base film of the bag body are torn along the aforementioned non-fusing portion where the fusing portion is not formed. Therefore, in addition to the linear cut operation caused by the aforementioned four pieces of the biaxially oriented film, the accurate linear cut operation, caused that the aforementioned non-fusing portion is to be a guide when the bag is torn by hands, can be obtained.

The space between the non-fusing portion and both fusing portions may be sufficient for guiding the tear along the non-fusing portion.

DETAILED DESCRIPTION OF THE PREFERRED EMBODIMENT(S)

The preferred embodiment according to the present invention will be explained in detail below with reference to FIG. 1 to FIG. 4.

Figure 1:
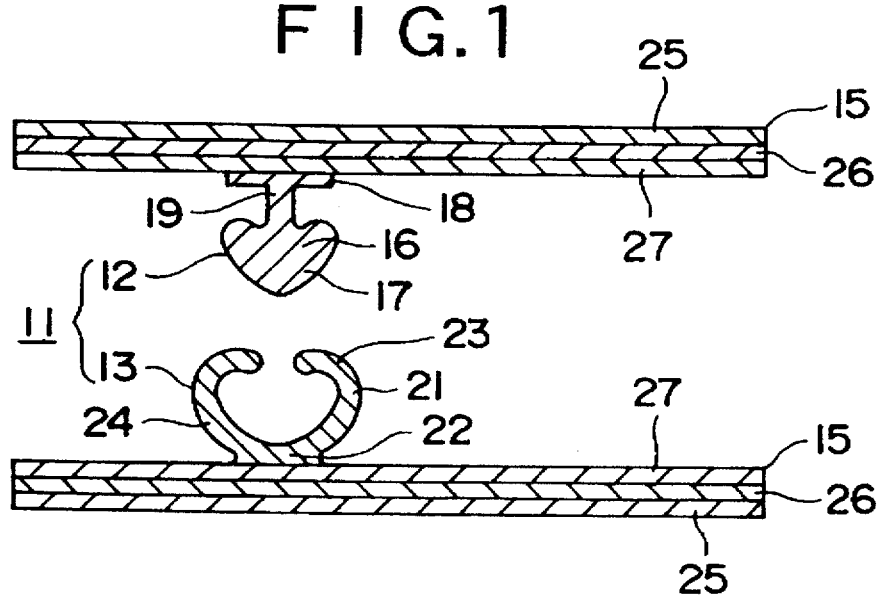
FIG. 1 is a sectional view of a snap fastener according to the preferred embodiment of the present invention.

As shown in FIG. 1, a snap fastener 11 of the preferred embodiment is composed of one band-like male strip member 12 and another band-like female strip member 13 engaging the male strip member 12.

The male strip member 12 includes a band-like base portion 15 fused onto a bag body 14, and a snapping portion 16 having a snapping function.

The snapping portion 16 is composed of a sectional heart-shaped male portion head portion 17, a band-like end portion 18 fused onto the band-like base portion 15, and a sectional rod-like coupling portion 19 coupling the heart-shaped male portion 17 and the end portion 18.

The female strip member 13 includes the band-like base portion 15 fused onto the bag body 14, and a snapping portion 21 having the snapping function.

The snapping portion 21 is composed of an end portion 22 fused onto the band-like base portion 15, an arc-like first hook portion 23 formed on the end portion 22, and an arc-like second hook portion 24 formed on the end portion 22 to mutually face the first hook portion 23.

The male strip member 12 and the snapping portion 16 of the female strip member 13 are made of synthetic resin having MI 1–20 g/10 min.

The male strip member 12 and the band-like base portion 15 are each a laminate film having a three-layer structure, which includes a first layer 25 fused onto the bag body 14, a second layer 26 laminated on the first layer 25, and a third layer 27 laminated on the second layer 26.

The first layer 25 is composed of a resin film capable of fusing onto an inner-most layer (sealant) 28 of the bag body 14, the second layer 26 is composed of a biaxially oriented film, for example, a biaxially oriented nylon film, and the third layer 27 is composed of a resin film capable of fusing the snapping portions 16 and 21.

The band-like base portion 15 having the aforementioned three-layer structure is produced by dry-laminating the three films, composing the first layer 25 to the third layer 27, through adhesives or by laminating to the extruding films, being the first layer 25 and the third layer 27, onto a film, being the second film 26.

Figure 3:
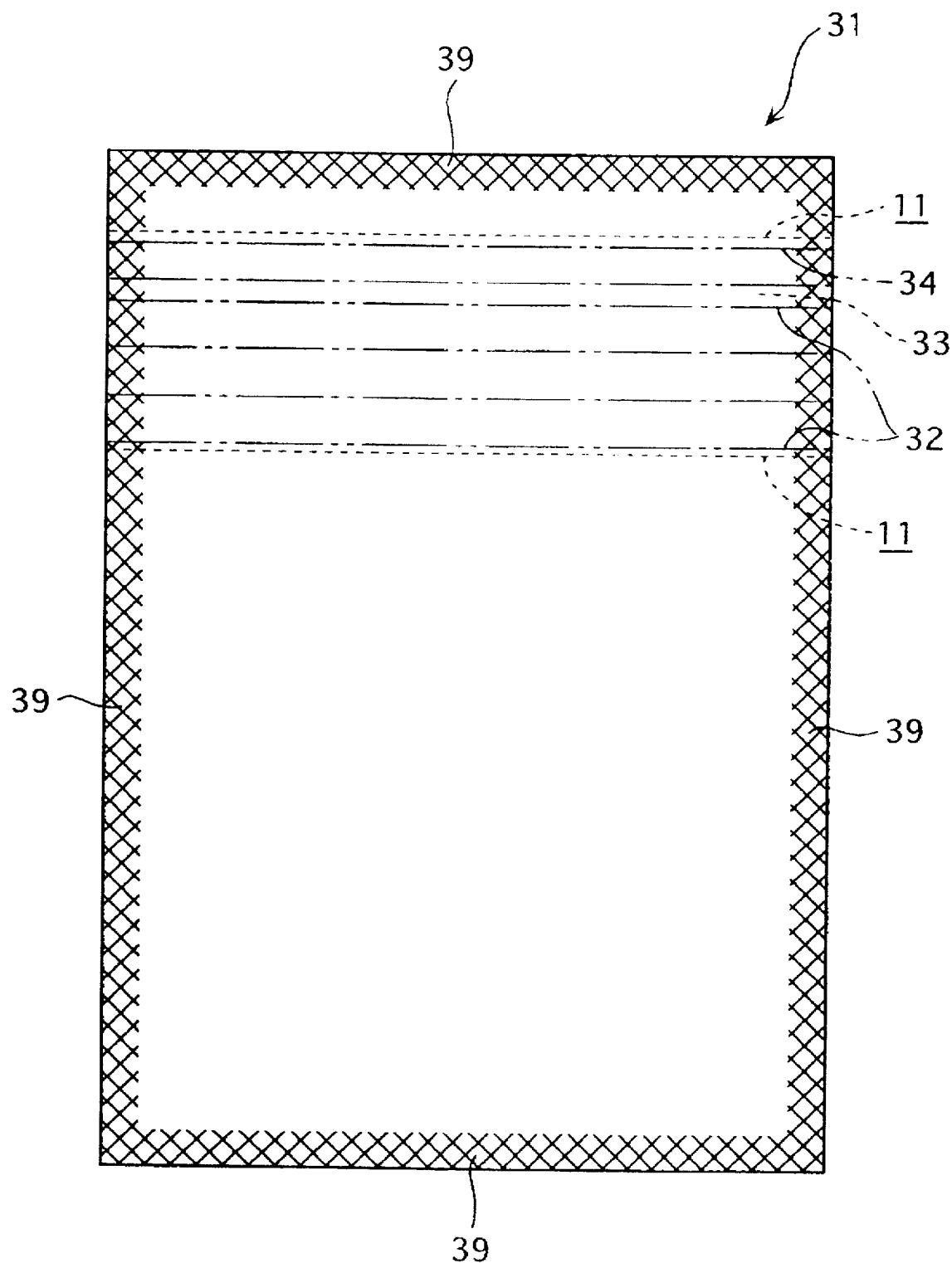
FIG. 3 is a plane view of the bag for packaging with the snap fastener of the preferred embodiment.

As shown in FIG. 3, a packaging bag 31 with the snap fastener 11 of the embodiment has the snap fastener 11 fused onto the bag body 14 through the first layer 25 of the band-like base portion 15.

Figure 4:
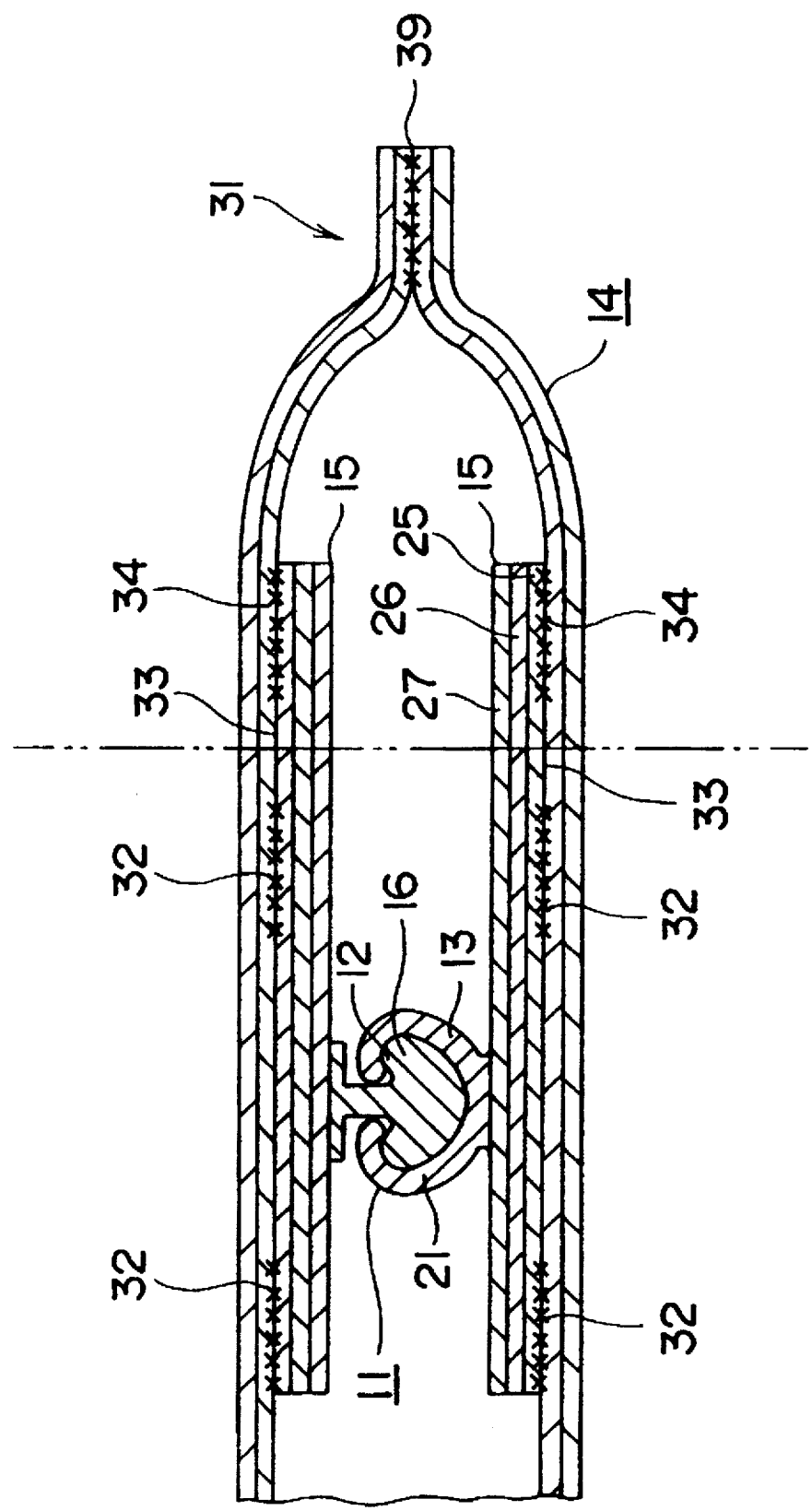
FIG. 4 is a fragmentary sectional view of the bag for packaging with the snap fastener of the preferred embodiment.

As shown in FIG. 4, a fused portion of the snap fastener 11 and the bag body 14 have a first fusing portion 32, formed adjacent to the snapping portions 16 and 21, and a second fusing portion 34, formed in the opening side of the bag body 14 to oppose a non-fusing portion 33 form the first fusing portion 32.

The aforementioned first and second fusing portions 32 and 34 can be formed as in the following.

Figure 2:
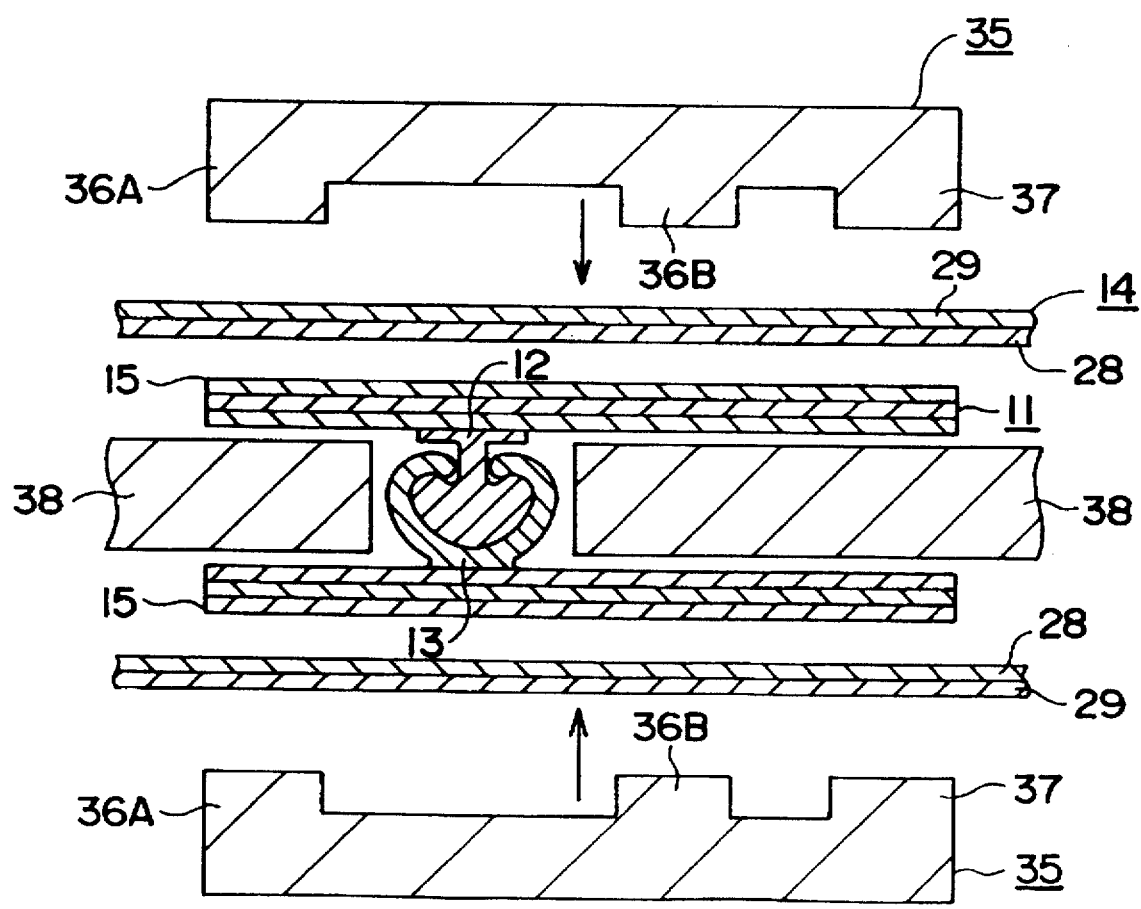
FIG. 2 is a sectional view showing a production process of a bag for packaging with the snap fastener of the preferred embodiment.

As shown in FIG. 2, in producing the bag, a seal bar 35, which includes first and second projection 36A and 36B, in order to form the first fusing portion 32, and a third projection 37, in order to form the second fusing portion 34, is ready and is arranged on the upper side and the lower side of the bag body 14 to fuse the snap fastener 11 and the bag body 14. At this time in the fusing process, between the male strip member 12 and the female strip member 13, a space-making plate 38 is arranged to prevent the male strip member 12 and the band-like base portion 15 of the female strip member 13 from fusing mutually.

EXPERIMENT 1

In the aforementioned embodiment, as films of the first layer 25 and the third layer 27 of the band-like base portion 15, an coextrusion film (the thickness of 40 μm, a trademark: UniLux LS-711C by Idemitsu Petrochemical Co., Ltd.) of linear low density polyethylene (L-LDPE) is used. As the biaxially oriented film for the second layer 26, a biaxially oriented nylon film (the thickness of 15 μm, a trademark: UniAslon TB-1010 by Idemitsu Petrochemical Co., Ltd.) is used. The biaxially oriented nylon film consists of 70% by weight of Ny 6 and 30% by weight of MXD 6, in which magnification of the MD direction and the TD direction in extending is each defined as 3.0 times.

The band-like base portion 15 of the experiment is made by dry-laminating the three pieces of film, which are going to be the aforementioned first layer 25 to the third layer 27, and then slitting the laminated film at a width of 20 mm.

As the material for the snapping portions 16 and 21, L-LDPE (MI: 6 g/10 min., a trademark: MoreTeck by Idemitsu Petrochemical Co., Ltd.) is used, in which the snapping portions 16 and 21 are formed by extruding onto the band-like base portion 15 to obtain the male strip member 12 and the female strip member 13, composing the snap fastener 11 of the experiment.

The male strip member 12 and the female strip member 13 of the snap fastener 11 are fused on the bag body 11, which is composed of the biaxially oriented nylon film (the thickness of 15 μm, a trademark: UniAslon TB-1010) as an outer base material 29 and the coextrusion film (the thickness of 40 μm, a trademark: UniLux LS-711C) of a linear chain low-density polyethylene (L-LDPE) as a sealant 28, so as to produce the packaging bag 31 with the snap fastener 11 of the experiment (see FIG. 2). A size of the packaging bag 31 is A4, in which seal portions 39 are formed on each side.

The conditions when the snap fastener 11 is fused on the bag body 14 are the temperature of 140° C. (413 K), the pressure of 1 Kg/cm² (0.1 MPa), and the number of shot of 40 piece/min. The width of the non-fusing portion 33 is 2 mm.

The conditions, when the snap fastener 11 corresponding to a position of the end portion of the bag 31 is forcibly pressed, are the temperature of 190° C. (463 K), the pressure of 2 Kg/cm² (0.2 MPa), and the number of shots of 30 piece/min.

EXPERIMENT 2

The packaging bag 31 with the snap fastener 11 is made in the same way as Experiment 1 without the following structure of the bag body 14.

More specifically, the bag body 14 of the experiment is composed of a laminate film for a moisture cloth agent having a four-layer structure which is laminated with, in order, paper (the thickness of 60 μm) as the outer base material, LDPE film (the thickness of 15 μm), aluminum foil (the thickness of 9 μm), LDPE film (the thickness of 30 μm) act as the sealant.

COMPARISON 1

The bag for packaging with the snap fastener in Comparison 1 is made by fusing the same bag body as Experiment 1 with the snap fastener having the band-like base portion of a single layer structure, which is composed of conventional L-LDPE (MI: 6 g/10 min.).

COMPARISON 2

The bag for packaging with the snap fastener in Comparison 2 is made by fusing the same bag body as Experiment 2 with the snap fastener having the band-like base portion of a single layer structure, which is composed of conventional L-LDPE (MI: 4 g/10 min.).

EVALUATION OF PROPERTIES

The bags for packaging with the snap fastener in the Experiments and Comparisons are each tested with a linear cut operation, creases produced on the fusing portions between band-like base portion and the bag body, and the degree of damage to the aluminum foil. The tested results are shown in Table 1 below.

The evaluation of the linear cut operation is carried out by measuring the amount of deviation of the opening formed on the back side and the front side of the film when the bag is opened with hands along the two-dotted line of FIG. 4 by forming notches (incisions) on the bag for packaging with the snap fastener. In the ten tested bags of each Experiment and Comparison, the case of all bags having the result of less than 5 mm is defined as O, and the case of more than five bags having the result exceeding 5 mm is defined as X. Incidentally, in Experiment, a notch is formed on the aforementioned non-fusing portion 33.

The evaluation of creases produced on the fusing portion of the band-like base portion and the bag body is carried out by visually verifying whether creases are produced on and around the fusing portion or not. The case whereby the creases are not virtually recognized is defined as O, and the existence of the creases being clearly recognized is defined as X.

The evaluation of the degree of damage of the aforementioned aluminum foil is carried out by verifying whether the damage, such as a fracture in the aluminum foil composing the bag body or the like, is produced or not. The number of damaged samples of 50 test samples is counted.

TABLE 1

|  | EX. 1 | EX. 2 | COM. 1 | COM. 2 |
| --- | --- | --- | --- | --- |
| Linear cut operation | O | — | X | — |
| creases on the fusing portion | O | — | X | — |
| The number of damaged aluminum foil | — | 6/50 | — | 43/50 |

EX.: Experiment
COM.: Comparison

From Table 1, as known in Experiment 1, in the packaging bag 31 with the snap fastener 11 according to the preferred embodiment, in addition to arranging the biaxially oriented nylon film, having a desirable linear cut operation, as the second layer 26 of each band-like base portion 15 of the male strip member 12 and the female strip member 13, it is provided with the non-fusing portion 33, as a tearing guide, between the first fusing portion 32 and the second fusing portion 34, therefore, it is understood that the accurate desirable line cut performance is obtained. And further, the arrangement of the biaxially oriented nylon film in the base material film of the bag body 14 causes the linear cut operation in opening the bag to be improved.

As indicated in Experiment 1, the band-like base portion 15 of the snap fastener 11 according to the embodiment has a three-layer structure of L-LDPE films for the first layer 25 and the third layer 27 and the biaxially oriented nylon film for the second layer 26, therefore, when the snap fastener 11 is fused through the band-like base portion 15 onto the bag body 14, an appearance of creases on the fusing portion between the band-like base portion and the bag body is prevented.

Further, as indicated in Experiment 2, the snapping portions 16 and 21 of the snap fastener 11 according to the embodiment consists of L-LDPE of MI: 6 g/10 min., and the band-like base portion 15 of the snap fastener 11 has the aforementioned three-layer structure, therefore, when the snap fastener corresponding to the position of the end of the bag 31 is forcibly pressed, as well as the snapping portions 16 and 21 are easily pressed, force generated to the bag body 14 is absorbed by the biaxially oriented nylon film of the second layer 26, with the result that an effect of the prevention of aluminum foil from being damaged is noticeable even when the bag body 14 includes aluminum foil.

On the other hand, the conventional bag for packaging with the snap fastener, relating to Comparison 1, consists of L-LDPE of MI: 6 g/10 min., in which the band-like base portion of the snap fastener is a single layer structure, therefore, the fine linear cut operation can not be obtained, and further, creases appear by shrinkage caused by heat when the snap fastener is fused through the band-like base portion onto the bag body.

The snapping portion of the conventional snap fastener relating to Comparison 2 consists of L-LDPE of MI: 4 g/10 min., and the band-like base portion of the snap fastener is the single layer structure, whereby the snapping portion is not easily pressed when the snap fastener corresponding to the position of the end of the bag is forcibly pressed, with the result that it is understood the snapping portion causes aluminum foil composing of the bag body to be damaged.

What is claimed is:

1. A snap fastener, having a male strip member and a female strip member which are mutually engaged and each has a band-like base portion and a snapping portion having a snapping function, the improvement comprising:

a first layer forming in the band-like base portion to be fused onto a bag body;

a second layer forming in the band-like base portion to be laminated onto said first layer; and a third layer forming in the band-like base portion to be laminated onto said second layer, said first layer consisting of a resin film fusing the inner-most layer of the bag body, said second layer consisting of a biaxially oriented film, said third layer consisting of a resin film fusing the snapping portion, and the snapping portion consisting of synthetic resin having a melt index (MI) of 1–20 g/10 min.

2. The snap fastener according to claim 1 wherein the biaxially oriented film of said second layer is a biaxially oriented nylon film having more than one layer.

3. The snap fastener according to claim 2 wherein at least one layer of the biaxially oriented nylon film consists 40–85% by weight of nylon 6 (Ny 6) and 15–60% by weight of meta-xylylene adipamide (MXD 6), in which both magnifications of the MD direction (the moving direction of the film) and the TD direction (the direction of the width of the film) in extending are more than 2.8 times.

4. A bag for packaging with a snap fastener, in which the bag for packaging is fused thereon with the snap fastener having a male strip member and a female strip member, mutually engaged and respectively having a band-like base portion and a snapping portion having a snapping function, the improvement comprising:

a first layer forming in the band-like base portion to be fused onto a bag body;

a second layer forming in the band-like base portion to be laminated onto said first layer; and a third layer forming in the band-like base portion to be laminated onto said second layer, said first layer consisting of a resin film fusing the most-inside layer of the bag body, said second layer consisting of a biaxially oriented film, said third layer consisting of a resin film fusing the snapping portion, and the snapping portion consisting of synthetic resin having a melt index (MI) of 1–20 g/10 min. and being fused through said first layer onto the bag body.

5. The bag for packaging with the snap fastener according to claim 4, further comprising:

a first fusing portion formed adjacent to the snapping portion, which is formed in a fusing portion fusing between the snapping portion and the bag body; and a second fusing portion formed in the opening side of the bag body to oppose a non-fusing portion from said first fusing portion, which is formed in the fusing portion fusing between the snapping portion and the bag body.

* * * * *